United States Patent
Nakamura

(10) Patent No.: US 7,435,456 B2
(45) Date of Patent: Oct. 14, 2008

(54) OPTICAL COMPENSATION FILM, POLARIZING PLATE AND LIQUID CRYSTAL DISPLAY

(75) Inventor: Ryo Nakamura, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 4 days.

(21) Appl. No.: 11/386,679

(22) Filed: Mar. 23, 2006

(65) Prior Publication Data

US 2006/0216435 A1    Sep. 28, 2006

(30) Foreign Application Priority Data

Mar. 25, 2005 (JP) .............................. 2005-088467

(51) Int. Cl.
*C09K 19/00* (2006.01)
*C09K 19/52* (2006.01)

(52) U.S. Cl. .......................... 428/1.1; 428/1.2; 430/20; 430/270.1; 252/299.01

(58) Field of Classification Search ................... 430/20, 430/270.1; 252/299.01; 428/1.1, 1.2
See application file for complete search history.

(56) References Cited

U.S. PATENT DOCUMENTS

2005/0140881 A1* 6/2005 Nimura et al. .............. 349/117
2006/0066804 A1* 3/2006 Tasaka ....................... 349/179

FOREIGN PATENT DOCUMENTS

JP          3 342 417          8/2002

* cited by examiner

*Primary Examiner*—Geraldina Visconti
(74) *Attorney, Agent, or Firm*—Buchanan Ingersoll & Rooney PC

(57) ABSTRACT

An optical compensation film is provided and includes a first optically anisotropic layer and a second optically anisotropic layer. It is characterized in that the first optically anisotropic layer includes discotic liquid crystal and the second optically anisotropic layer has an Re(550) value of 15 to 150 nm and an Rth(550) value of −40 to 10 nm, and a polarizing plate using such an optical compensation film.

6 Claims, 1 Drawing Sheet

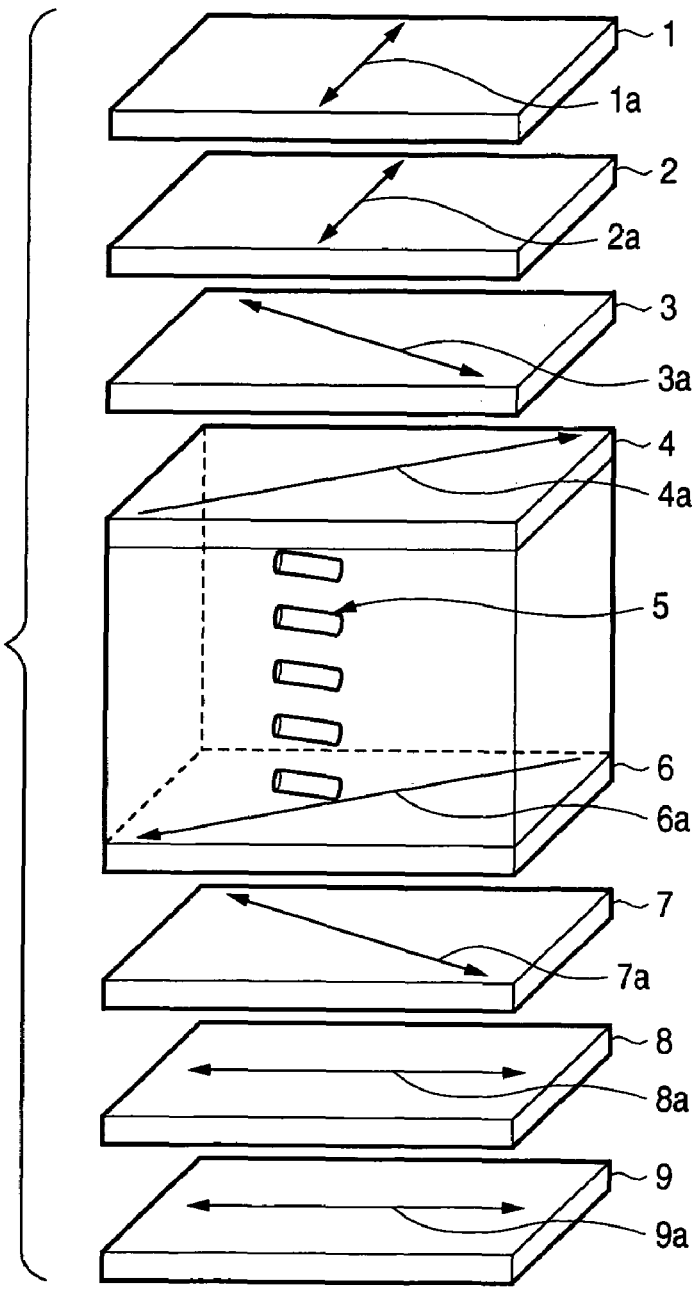

OPTICAL COMPENSATION FILM, POLARIZING PLATE AND LIQUID CRYSTAL DISPLAY

FIELD OF THE INVENTION

The present invention relates to an optical compensation film, and to a polarizing plate and a liquid crystal display using such a film.

BACKGROUND OF THE INVENTION

A liquid crystal display is provided with a liquid crystal cell and a polarizing plate. The polarizing plate includes a protective film and a polarizer, and can be obtained by dyeing a polyvinyl alcohol film forming the polarizer with iodine, stretching the film and then laminating both sides of the resulting film with protective films. In a transmission liquid crystal display, this polarizing plate is mounted on either side of the liquid crystal cell and one or more of an optical compensation film may further be placed. In a reflection liquid crystal display, a reflector, a liquid crystal cell, one or more of an optical compensation film and a polarizing plate are arranged in the order of mention. The liquid crystal cell is made up of liquid crystalline molecules, two substrates for sealing in these molecules, and electrode layers for applying a voltage to the liquid crystalline molecules. The liquid crystal cell performs an ON/OFF display by differences in aligned states of liquid crystalline molecules, and there have been proposals for its display modes applicable to both transmission and reflection display devices, such as TN (Twisted Nematic), IPS (In-Plane Switching), OCB (Optically Compensatory Bend), VA (Vertically Aligned) and ECB (Electrically Controlled Birefringence) modes.

Optical compensation films are used in various liquid crystal displays for the purposes of getting rid of image coloration and enlarging a viewing angle. Hitherto used optical compensation films are birefringent drawn polymer films. In substitution for optical compensation films made of birefringent drawn films, it has also been proposed to use optical compensating films having on their respective transparent substrates optically compensating layers made from low-molecular or high-molecular liquid crystalline molecules. Since the liquid crystalline molecules are various in their alignment forms, the use thereof makes it possible to achieve optical properties unobtainable by use of traditional birefringent drawn polymer films. Further, there have been proposals of protective films designed to serve also as optical compensation films through addition of birefringence to the protective films constituting polarizing plates.

Optical properties of an optical compensation film are determined with reference to optical properties of a liquid crystal cell, specifically distinctions among the display modes as mentioned above. When liquid crystalline molecules are used, it becomes possible to make optical compensation films having diverse optical properties responding to various display modes of liquid crystal cells. As to optical compensation films using liquid crystalline molecules, those appropriate to various display modes have already been proposed.

For instance, at the black display time in a voltage-unapplied condition, optical compensation films for parallel-orientation liquid crystal cells double as optical compensators for liquid crystalline molecules oriented parallel to the substrate surface and improvers of viewing angle characteristics of polarizer's orthogonal transmittance (See Japanese Patent No. 3342417).

However, it is extremely difficult to perfectly provide optical compensation for a liquid crystal cell with no problems even when optical compensation films are used. For instance, it is not enough to compensate a liquid crystal cell alone, but it is necessary to compensate also a light leak in a direction of 45 degrees from the transmission axis of a polarizing plate. In addition, the use of two or more retardation films causes considerable drop in productivity because additional processes including a stacking process are added.

SUMMARY OF THE INVENTION

An object of an illustrative, non-limiting embodiment of the invention is to provide an optical compensation film having a simple makeup and high productivity and ensuring substantial improvements in display quality and viewing angle characteristics, and to provide a polarizing plate and a liquid crystal display equipped with such an optical compensation film.

Exemplary embodiments of the invention is as follows.

(1) An optical compensation film comprising: a first optically anisotropic layer formed form a discotic liquid crystalline compound; and a second optically anisotropic layer having an Re(550) of 15 to 150 nm and an Rth(550) of −40 to 10 nm, wherein Re($\lambda$) is an in-plane retardation by nm at a wavelength of $\lambda$ nm, and Rth($\lambda$) is a thickness-direction retardation by nm at a wavelength of $\lambda$ nm.

(2) The optical compensation film according to (1), wherein the second optically anisotropic layer comprises cellulose acylate.

(3) The optical compensation film according to (1) or (2), which is a film cut from a long length of roll film along a direction parallel or perpendicular to the longitudinal direction of the roll film.

(4) A polarizing plate comprising: a polarizer; and an optical compensation film according to any one of (1) to (3).

(5) The optical compensation film according to any one of (1) to (3), which is for a liquid crystal display of ECB mode.

(6) The optical compensation film according to any one of (1) to (3), which is for a liquid crystal display of ECB mode, wherein the liquid crystal display comprises a polarizer and a liquid crystal cell driven in ECB mode, and the optical compensation film is used in the liquid crystal display in conditions that: a transmission axis of the polarizer and a slow axis of the second optically anisotropic layer are parallel, the slow axis of the second optically anisotropic layer forms an angle of 45 degrees with respect to a slow axis of the first optically anisotropic layer, and the slow axis of the first optically anisotropic layer and a slow axis of the liquid crystal cell are orthogonal to each other.

In accordance with the invention, it is possible to provide an optical compensation film that has a simple makeup and high productivity and ensures substantial improvements in display quality and viewing angle characteristics, and to provide a polarizing plate equipped with such an optical compensation film. The present optical compensation film is suitable for application to liquid crystal displays, especially in ECB mode. Further, production of the present polarizing plate does not need the stacking process while strictly controlling angles between one or more retardation films and polarizing plates, so roll-to-roll production becomes possible.

BRIEF DESCRIPTION OF THE DRAWING

The sole FIGURE is a schematic diagram showing a configuration example of a liquid crystal display according to an illustrative, non-limiting embodiment of the invention.

DETAILED DESCRIPTION OF THE INVENTION

Further description of the invention is given below with the aid of a drawing.

The FIGURE is a schematic diagram showing a configuration example of a liquid crystal display using an optical compensation film according to an exemplary embodiment of the invention.

The liquid crystal display of ECB mode shown in the FIGURE has a liquid crystal cell made up of a liquid crystal layer containing liquid crystalline molecules 5 and substrates 4 and 6 between which the liquid crystal layer is sandwiched. The upper substrate 4 and the lower substrate 6 have their respective alignment films (not shown in the FIGURE) and electrode layers (not shown in the FIGURE). Polarizers 1 and 9 are placed so as to insert the liquid crystal cell between them. First optically anisotropic layers 3 and 7 are disposed between the polarizer 1 and the liquid crystal cell and between the liquid crystal cell and the polarizer 9, respectively, and second optically anisotropic layers 2 and 8 are also disposed as were the first-optically anisotropic layers. In addition to the first and second optically anisotropic layers, other (third and fourth) optically anisotropic layers may be provided. It is preferable to use an elliptically polarizing plate into which the first and second optically anisotropic layers are integrated with a polarizing plate.

Alternatively, the first and second optically anisotropic layers may be incorporated into a liquid crystal display as an integrated member, or they can also be incorporated as separate members. The first and second optically anisotropic layers may be disposed between the liquid crystal cell and the polarizer on the side of display screen, or between the liquid crystal cell and the polarizer on the backlight side.

Transmission axes 1a and 9a of the polarizers 1 and 9 are placed so that they are orthogonal to each other, and besides, they are parallel to slow axes 2a and 8a of the second optically anisotropic layers 2 and 8, respectively. The slow axes 2a and 8a of the second optically anisotropic layers 2 and 8 are located so as to form an angle of 45 degrees with respect to the direction of slow axes 3a and 7a of the first optically anisotropic layers 3 and 7. The slow axes 3a and 7a of the first optically anisotropic layers 3 and 7 are placed so as to be orthogonal to alignment control directions 4a and 6a of the substrates 4 and 6, respectively.

The liquid crystal cell is made up of the upper substrate 4, the lower substrate 6, and a liquid crystal layer sandwiched between these substrates and formed of liquid crystalline molecules 5. At the surfaces of the substrates 4 and 5, which are contiguous to the liquid crystalline molecules (hereinafter referred to as "inner surfaces" in some cases), alignment films (not shown in the FIGURE) are formed. The alignment films have a function of aligning liquid crystalline molecules by undergoing rubbing treatment or the like. A rubbing direction of the upper substrate 4 is adjusted so as to be parallel to the rubbing direction 6a of the lower substrate 5, and the liquid crystalline molecules 5 are in parallel orientation without having a twist structure. Further, transparent electrodes (not shown in the FIGURE) capable of applying a voltage to the liquid crystal layer made up of liquid crystalline molecules 5 are formed at the inner surfaces of the substrates 4 and 6. The transparent electrodes have a function of applying a voltage to liquid crystalline molecules 5. The transparent electrodes are generally prepared from transparent indium tin oxide (ITO).

The invention has no particular restrictions as to liquid crystal materials used, but it is preferable to use liquid crystal materials positive in dielectric constant anisotropy.

In the invention, it is appropriate that the product $\Delta n \cdot d$ of a thickness d (micron) and a refractive index anisotropy $\Delta n$ of the liquid crystal layer be adjusted to a range of 0.1 to 1.5 micron, preferably 0.12 to 0.9 micron, far preferably 0.15 to 0.5 micron. In these ranges, white display brightness is high and black display brightness is low, so high-constant bright display devices can be obtained.

Those optimum values are values in transmission mode, and the optimum $\Delta n \cdot d$ value in reflection mode becomes almost one-half the value as mentioned above since the optical pass within a liquid crystal cell in reflection mode is twice as long as that in transmission mode.

Liquid display devices with the foregoing makeup offer white displays during voltage-off conditions and black displays during high-voltage-applied conditions, namely normally white displays. The black displays are obtained when the Re value of an optical compensation film agrees with a retardation value of a liquid crystal layer under voltage-applied conditions.

During non-driven conditions in which no drive voltage is applied to transparent electrodes (not shown in the FIGURE) mounted on the substrates 4 and 6, respectively, the liquid crystalline molecules 5 of the liquid crystal layer are oriented in roughly parallel to the surfaces of the substrates 4 and 6; as a result, the light passing through changes its polarization state by a birefringence effect of the liquid crystalline molecules 5, and can pass through the polarizer 1. Herein, the $\Delta n \cdot d$ value of the liquid crystal layer is adjusted to the foregoing range so that the quantity of the light transmitted becomes maximum. On the other hand, during driven conditions in which a drive voltage is applied to the transparent electrodes (not shown in the FIGURE), the liquid crystalline molecules 5 try to align vertically to the surfaces of the substrates 4 and 6. Although liquid crystalline molecules are almost vertically oriented with respect to the substrate surface at depths near the center of space between the substrates, they are oriented in parallel to the substrate surfaces in the vicinity of interfaces between substrate surfaces and the liquid crystal layer, and are arranged so as to tilt to continuously varying angles as their positions approach to the central depth. Under these conditions, it is difficult to achieve perfect black display. In addition, the average orientation of tilted liquid crystalline molecules in the vicinity of the interface to the substrate varies depending on the observation angle, and the transmittance and the brightness vary as the viewing angle is changed, namely viewing-angle dependency is caused. Therefore, an optical compensation film capable of compensating the residual retardation in the vicinity of the substrate interface of the liquid crystal layer is disposed, and thereby complete black display is achieved and frontal contrast ratio is enhanced.

The liquid crystal display in the invention is not limited to that having the makeup shown in the FIGURE, but it may include other members. For instance, a color filter may be inserted between a liquid crystal cell and a polarizer. In addition, an additional optical compensation film may be placed between a liquid crystal cell and a polarizing plate. When the display device is used in transmittance mode, a backlight using as a light source a cold-cathode or hot-cathode fluorescent tube, light-emitting diodes, field emission devices or electroluminescent devices can also be placed in the rear. Alternatively, the liquid crystal display in the invention may be in reflectance mode. In this case, placement of only one polarizing plate on the viewing side is enough, and a reflection film is disposed on the back of a liquid crystal cell or on the inside surface of the lower substrate of a liquid crystal cell. Of course, it is also possible to place a front light using the light source as recited above on the viewing side of the liquid crystal cell.

The liquid crystal display in the invention may be of the direct-image-view type, the image-projection type, or the light-modulation type. An especially effective aspect of the invention is application to active-matrix liquid crystal displays using three-terminal or two-terminal semiconductor elements. Of course, another effective aspect of the invention is application to liquid crystal displays of passive-matrix type referred to as time-division drive, notably STN liquid crystal displays.

The terms "45°", "parallel", and "vertical" or "orthogonal" as used in the present specification are intended to include the ranges of their respective exacting angles ± less than 5°. The tolerances on the exacting angles are preferably less than ±4°, far preferably less than ±3°.

The term "a polarizing plate" as used in the present specification, unless otherwise noted, is intended to include both a long length of polarizing plate and a polarizing plate cut in a size suitable for incorporation into a liquid crystal device (the term "cut" as used in the present specification is intended to include "stamp" and "cut up into"). In addition, the term "a polarizing plate" is used in the present specification as distinguished from the term "a polarizer", and the term "a polarizing plate" means a stacking of "a polarizer" and a protective film provided on at least one side of the polarizer for the purpose of protecting the polarizer. In some cases, the polarizing plate further includes an optical compensation film, wherein the protective film may also serve as the optical compensation film. Furthermore, the present polarizing plate may include a substrate.

Re(λ) and Rth(λ) in the present specification are an in-plane retardation and a thickness-direction retardation at the wavelength λ, respectively. In the invention, Re(λ) is defined as a value measured with KOBRA 21ADH (made by Oji Scientific Instruments) as light with a wavelength of λ nm is made to strike upon a film in the direction of the normal to the film surface. On the other hand, Rth(λ) is a value calculated on a basis of retardation values measured in three different directions by use of KOBRA 21 ADH, wherein the three retardation values are Re(λ), a retardation value measured under conditions that the slow axis (judged by use of KOBRA 21ADH) is taken as an axis of tilt (rotation axis) and light with a wavelength of λ nm is made to strike from a direction tilting to +40° with respect to the direction of the normal to the film and a retardation value measured under conditions that the slow axis is taken as an axis of tilt (rotation axis) and light with a wavelength of λ nm is made to strike from a direction tilting to −40° with respect to the direction of the normal to the film. Herein, as to assumed values of average refractive indices, those listed in Polymer Handbook (JOHN WILEY & SONS, INC) and catalogs of various optical films can be utilized. The average refractive indices of optical films can be measured with an Abbe refractometer even when they are unknown yet. The values of average refractive indices of major optical films are enumerated below: Cellulose acylate (1.48), cycloolefin polymer (1.52), polycarbonate (1.59), polymethyl methacrylate (1.49) and polystyrene (1.59).

By inputting these assumed average refractive indices and film thicknesses, KOBRA21ADH calculates nx, ny and nz.

The wavelength for measurements of retardation and refractive indices is λ=550 nm unless otherwise noted.

The present optical compensation films and materials used for various members usable in polarizing plates and liquid crystal displays, into which the present optical compensation films are introduced, and manufacturing methods thereof are illustrated below in detail.

(First Optically Anisotropic Layer)

Optical compensation films according to the invention are not particularly restricted as to their materials, but it is preferable that they are made from liquid crystalline compounds. Each of the first optically anisotropic layers may be formed directly on the surface of a transparent film, or it may be formed on an alignment film formed in advance on a transparent film. Alternatively, it is possible to make the present optical compensation film by forming a layer of liquid crystalline compound on a separate substrate, and then by transferring the layer to a transparent film by use of a pressure-sensitive adhesive or a bonding adhesive.

The first optically anisotropic layer is formed using a composition at least one compound shaped like a disc (hereinafter referred to as "a discotic compound" in some cases). Although it is preferable that the discotic compound is a liquid crystalline compound, it is no longer required for the compound finally contained in the optically anisotropic layer to have liquid crystallinity. For instance, such a case includes situations in which low molecular-weight liquid crystalline compounds used for making optically anisotropic layers are cross-linked in the process of forming the optically anisotropic layers to lose their liquid crystallinity.

Examples of a discotic liquid crystalline compound include the benzene derivatives described in a research report by C. Destrade et al., *Mol. Cryst.*, vol. 71, p. 111 (1981); the toluxene derivatives described in a research report by C. Destrade et al., *Mol. Cryst.*, vol. 122, p. 141 (1985), and *Physics lett. A*, vol. 78, p. 82 (1990); the cyclohexene derivatives described in a research report by B. Kohne et al., *Angew. Chem.*, vol. 96, p. 70 (1984); the azacrown and phenylacetylene series macrocycles described in a research report by J. M. Lehn et al., *J. Chem. Commun.*, p. 1794 (1985), and a research report by J. Zhang et al., *J. Am. chem. soc.*, vol. 116, p. 2655 (1994).

In the discotic liquid crystalline compounds are also included compounds showing liquid crystalinity, which each have a structure that linear alkyl, alkoxy or substituted benzoyloxy groups are radially attached as side chains to their respective mother nuclei as molecular center. It is preferable that their individual molecules or their molecular aggregates have rotational symmetry and can give a certain orientation In the case of forming an optically anisotropic layer from a liquid crystalline compound, as described above, it is no longer required for the compound finally contained in the optically anisotropic layer to show liquid crystallinity. Specifically, cases are permissible where optically anisotropic layers are formed from low molecular-weight discotic liquid crystalline compounds having thermally reactive or photoreactive groups by conversion into high molecular-weight compounds via polymerization or cross-linking caused by thermal reaction or photochemical reaction of those groups, and the high molecular weight compounds thus contained in the optically anisotropic layers no longer have liquid crystallinity. Suitable examples of discotic liquid crystalline compounds are described in JP-A-8-50206. As to the polymerization of discotic liquid crystalline compounds, descriptions thereof can be found in JP-A-8-27284.

For a discotic liquid crystalline compound to be fixed by polymerization, it is required that polymerizing groups as substituent groups are made to combine with a disc-shaped core of the discotic liquid crystalline compound. However, direct binding of polymerizing groups to the disc-shaped core makes it difficult to keep an aligned state in polymerization reaction. So linkage groups are introduced between the disc-shaped core and polymerizing groups. Accordingly, it is appropriate that the discotic liquid crystalline compound having polymerizing groups be a compound represented by the following formula (III).

D(-L-Q)$_n$  Formula (III)

In formula (III), D is a disc-shaped core, L is a divalent linkage group, Q is a polymerizing group, and n is an integer of 4 to 12.

Examples of a disc-shaped core (D) are illustrated below. In each of the following examples, LQ (or QL) stands for the combination of a divalent linkage group (L) with a polymerizing group (Q).

(D1)
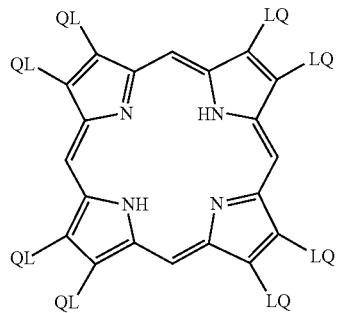

(D2)
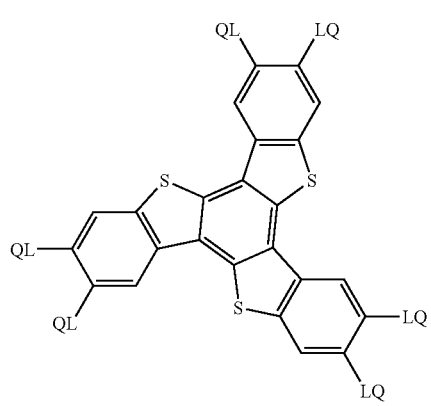

(D3)
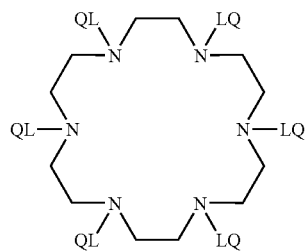

-continued (D4)
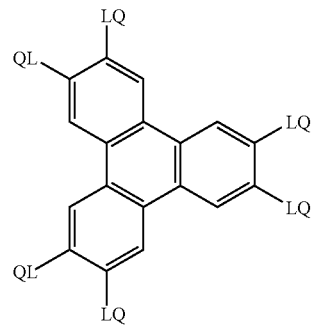

(D5)
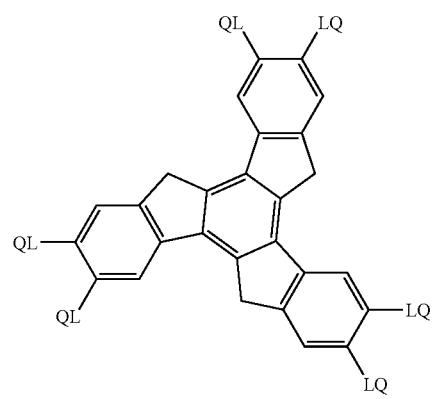

(D6)
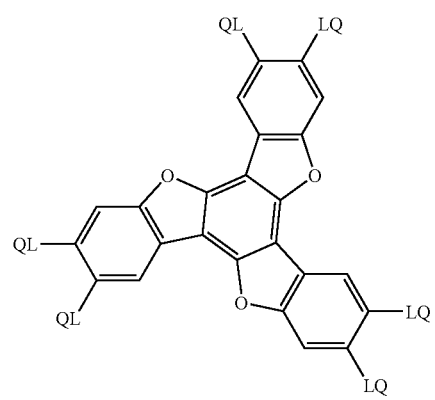

(D7)
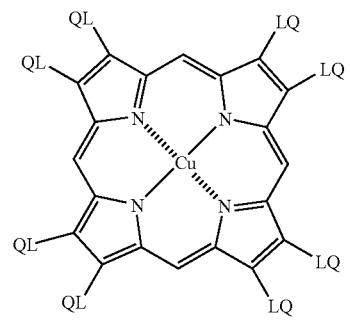

-continued
(D8)
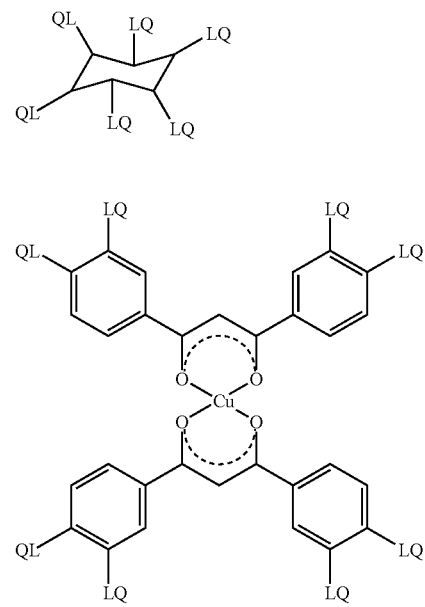
(D9)
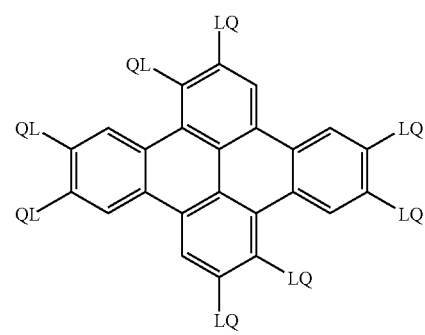
(D10)
(D11)
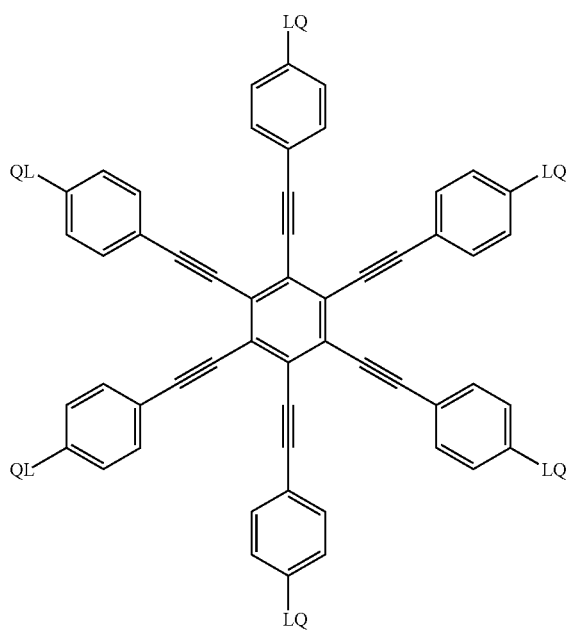
-continued
(D12)
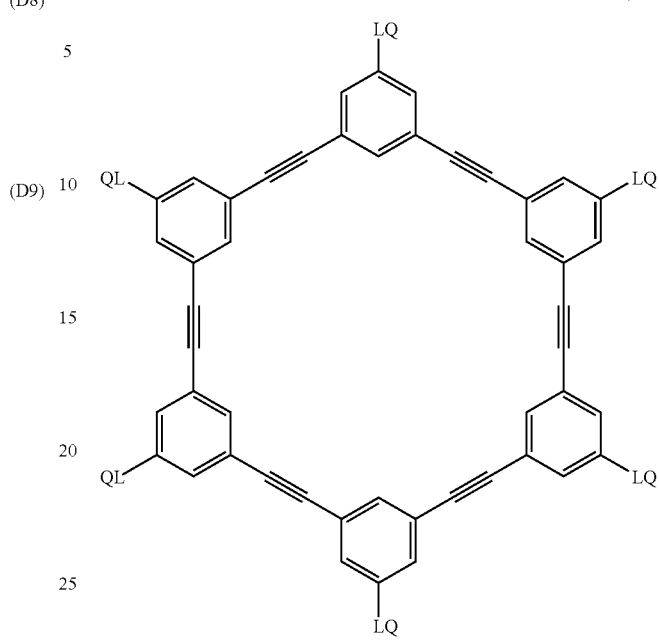
(D13)
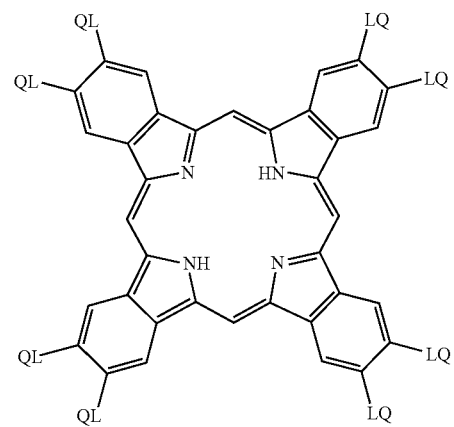
(D14)
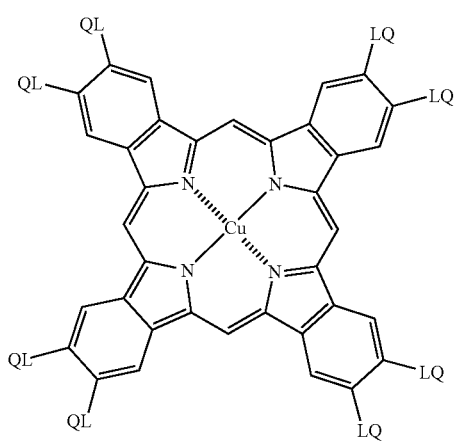

-continued

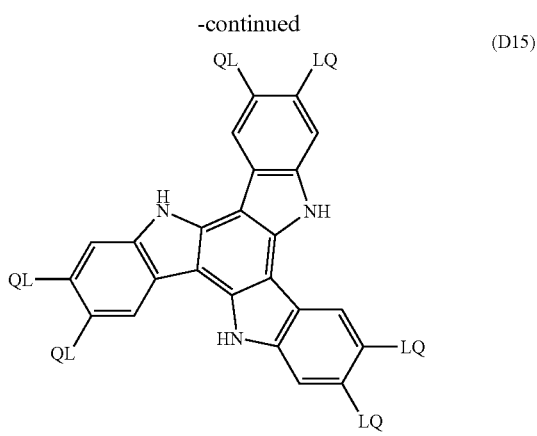

(D15)

In formula (III), the divalent linkage group (L) is preferably a divalent linkage group selected from the class consisting of alkylene groups, alkenylene groups, arylene groups, —CO—, —NH—, —O—, —S— and combinations of two or more of these groups. It is preferable by far that the divalent linkage group (L) is a divalent linkage group formed by combining at least two divalent groups selected from the class consisting of alkylene groups, arylene groups, —CO—, —NH—, —O— and —S—. And the most suitable divalent linkage group (L) is a divalent linkage group formed by combining at least two divalent groups selected from the class consisting of alkylene groups, arylene groups, —CO— and —O—. The number of carbon atoms contained in such an alkylene group is preferably from 1 to 12. The number of carbon atoms contained in such an alkenylene group is preferably from 2 to 12. The number of carbon atoms contained in such an arylene group is preferably from 6 to 10.

Examples of the linkage group (L) are shown below. Each of the following linkage groups is bound to the disc-shaped core at the left side and to the polymerizing group (O) at the right side. AL stands for an alkylene group or an alkenylene group, AR stands for an arylene group. These alkylene, alkenylene and arylene groups may have substituents (e.g., alkyl groups).

L1: -AL-CO—O-AL-
L2: -AL-CO—O-AL-O—
L3: -AL-CO—O-AL-O-AL-
L4: -AL-CO—O-AL-O—CO—
L5: —CO-AR—O-AL-
L6: —CO-AR—O-AL-O—
L7: —CO-AR—O-AL-O—CO—
L8: —CO—NH-AL-
L9: —NH-AL-O—
L10: —NH-AL-O—CO—
(0033)
L11: —O-AL-
L12: —O-AL-O—
L13: —O-AL-O—CO—
L14: —O-AL-O—CO—NH-AL-
L15: —O-AL-S-AL-
L16: —O—CO-AR—O-AL-CO—
L17: —O—CO-AR—O-AL-O—CO—
L18: —O—CO-AR—O-AL-O-AL-O—CO—
L19: —O—CO-AR—O-AL-O-AL-O-AL-O—CO—
L20: —S-AL-
L21: —S-AL-O—
L22: —S-AL-O—CO—
L23: —S-AL-S-AL-
L24: —S-AR-AL-

The polymerizing group (O) in formula (III) depends on the type of polymerization reaction. As the polymerizing group (Q), an unsaturated polymerizing group or an epoxy group is suitable, an unsaturated polymerizing group is more suitable, and an ethylenic unsaturated polymerizing group is most suitable.

In formula (III), n is an integer of 4 to 12. The concrete FIGURE depends on the kind of the disc-shaped core (D). Two or more L/Q combinations may be different from one another, but they are preferably the same.

The average orientation direction of symmetry axes of liquid crystalline compound molecules can generally be adjusted by selecting a proper liquid crystalline compound or a proper material for the alignment film, or by selecting a proper method for rubbing treatment. In the invention, when an alignment film for formation of an optically anisotropic layer is prepared by rubbing treatment, for example, the rubbing treatment in a direction of 45° with respect to the slow axis of a transparent film makes it possible to form the optically anisotropic layer in which the average orientation direction of symmetry axes of liquid crystalline compound molecules on at least the interface to a transparent film is 45° with respect to the slow axis of the transparent film. For instance, the present optical compensation film can be continuously prepared using a roll of long length of transparent film whose slow axis is parallel with the direction of the length. More specifically, a coating solution for forming an alignment film is applied continuously to the surface of a long length of transparent film to form a coating, then the surface of the coating formed is continuously subjected to rubbing treatment in the direction of 45° with respect to the direction of the length, further on the alignment film thus formed is coated continuously a coating solution containing a liquid crystalline compound for forming an optically anisotropic layer, and thereby the molecules of the liquid crystalline compound are oriented and is fixed to this state to result in formation of the optically anisotropic layer. Thus, a long length of optical compensation film can be prepared continuously. The optical compensation film prepared in long length is cut in desired shape. Herein, it is preferable to cut the film along the direction perpendicular or parallel to the direction of the length.

It is preferable that plasticizers, surface active agents and polymerizing monomers used together with liquid crystalline compounds have compatibility with discotic liquid crystalline compounds, or cause a change in tilt angles of the liquid crystalline compounds or no inhibition against alignment. Polymerizing monomers (compounds having vinyl, vinyloxy, acryloyl and methacryloyl groups) are preferred. The proportion of those compounds added to the liquid crystalline compound used is generally from 1 to 50% by mass, preferably from 5 to 30% by mass. When a mixture of polymerizing monomers having 4 or more reactive functional groups is used, adhesion between the alignment film and the optically anisotropic layer can be enhanced.

In the case of using discotic liquid crystalline compounds as liquid crystalline compounds, it is preferable to use polymers having a certain extent of compatibility with the discotic liquid crystalline compounds and capable of causing changes in tilt angles of the discotic liquid crystalline compounds.

Such polymers are, e.g., cellulose esters. Suitable examples of cellulose esters include cellulose acetate, cellulose acetate propionate, hydroxypropyl cellulose and cellulose acetate butyrate. In order not to cause inhibition against alignment of discotic liquid crystalline compound molecules, it is appropriate that the proportion of a polymer added to the discotic liquid crystalline compound used be in the range of 0.1 to 5% by mass, preferably 0.1 to 8% by weight, far preferably 0.1 to 5% by mass.

It is appropriate that the discotic liquid crystalline compounds range in discotic nematic liquid crystal phase-solid phase transition temperature from 170 to 300° C., preferably 70 to 170° C.

In the invention, the first optically anisotropic layer has at least in-place optical anisotropy. The in-plane retardation Re of the optically anisotropic layer is preferably from 3 to 300 nm, far preferably from 15 to 200 nm, particularly preferably from 10 to 100 nm. The thickness-direction retardation Rth of the optically anisotropic layer is preferably from 20 to 400 nm, far preferably from 50 to 200 nm. The thickness of the optically anisotropic layer is preferably from 0.1 to 20 microns, far preferably from 0.5 to 15 microns, particularly preferably from 1 to 10 microns.

(Alignment Film)

In forming the first optically anisotropic layer, an alignment film may be utilized. The alignment film may end in incorporation into the present optical compensation film, or the use thereof may be limited to the formation time of the first optically anisotropic layer, so the alignment film needn't be incorporated in the present optical compensation film.

In the invention, it is preferable that the alignment film is a layer made from a cross-linked polymer. The polymer used for the alignment film may be a polymer capable of being cross-linked by itself, or it may be a polymer capable of being cross-linked with the aid of a cross-linking agent. The alignment film can be formed through the reaction occurring between polymers having functional groups or functional groups-introduced polymers by light, heat or pH change, or the formation of the alignment film can be effected by using a cross-linking agent as a compound with high reaction activity and forming cross-links between polymers through introduction of the bonding groups having their origins in the cross-linking agent between the polymers.

The formation of an alignment film including a cross-linked polymer can generally be effected through application of a coating solution containing a self-cross-linkable polymer or a mixture of polymer with cross-linking agent to a substrate, and subsequent heating of the coating solution.

In order to prevent the alignment film from giving rise to dust in a rubbing process described hereinafter, it is advantageous to heighten the cross-linking degree in the alignment film. When the cross-linking degree is defined as the value (1−(Ma/Mb)) obtained by subtracting the ratio Ma/Mb from 1 wherein Mb stands for the amount of the cross-linking agent added to the coating solution and Ma stands for the amount of the cross-linking agent remaining after cross-linking, the cross-linking degree is preferably from 50% to 100%, far preferably from 65% to 100%, particularly preferably from 75% to 100%.

In the invention, any of self-cross-linkable polymers and polymers capable of being cross-linked by cross-linking agents can be used as polymers for the alignment film. Of course, polymers having both functions can also be used. Examples of such polymers include polymers, such as polymethyl methacrylate, acrylic acid-methacrylaic acid copolymer, styrene-maleinimide copolymer, polyvinyl alcohol and modified polyvinyl alcohol, poly(N-methylolacrylamide), styrene-vinyl toluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, carboxymethyl cellulose, gelatin, polyethylene, polypropylene and polycarbonate; and compounds like silane coupling agents. Of these enumerated polymers, water-soluble polymers including poly(N-methylolacrylamide), carboxymethyl cellulose, gelatin, polyvinyl alcohol and modified polyvinyl alcohol are preferred over the others. Among the water-soluble polymers, gelatin, polyvinyl alcohol and modified polyvinyl alcohol are far preferred, and polyvinyl alcohol and modified polyvinyl alcohol are best of all.

Examples of polyvinyl alcohol include those having saponification degrees ranging from 70 to 100%, and polyvinyl alcohol having its saponification degree in the range of 80 to 100% is generally preferred. The more suitable saponification degree of polyvinyl alcohol is from 82 to 98% and the suitable polymerization degree of polyvinyl alcohol is from 100 to 3,000.

Examples of modified polyvinyl alcohol include polyvinyl alcohol modified by copolymerization (wherein modifying groups, such as COONa, Si(OX)$_3$, N(CH$_3$)$_3$·Cl, C$_9$H$_{19}$COO·SO$_3$Na or C$_{12}$H$_{25}$ groups, are introduced), polyvinyl alcohol modified by chain transfer (wherein modifying groups, such as COONa, SH or SC$_{12}$H$_{25}$ groups, are introduced), and polyvinyl alcohol modified by block polymerization (wherein modifying groups, such as COOH, CONH$_2$, COOR or C$_6$H$_5$ groups, are introduced). The suitable polymerization degree of such modified polyvinyl alcohol is from 100 to 3,000. Of such polyvinyl alcohol, unmodified or modified polyvinyl alcohol having a saponification degree of 80 to 100% is preferable, and unmodified or alkylthio-modified polyvinyl alcohol having a saponification degree of 85 to 95% is preferable by far.

As modified polyvinyl alcohol used for the alignment film, a reaction product prepared from polyvinyl alcohol and a compound represented by the following formula (6).

Formula (6):

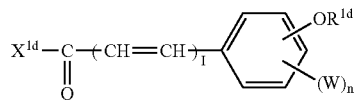

In the above formula, $R^{1d}$ represents an unsubstituted alkyl group, an acryloyl group, a methacryloyl group, or an epoxy-substituted alkyl group, W represents a halogen atom, an alkyl group or an alkoxy group, $X^{1d}$ represents atoms required for forming an active ester, an acid anhydride or an acid halide, and l represents 0 or 1, and n represents an integer of 0 to 4.

In addition, a reaction product prepared from polyvinyl alcohol and a compound represented by the following formula (7) is also suitable as modified polyvinyl alcohol used for the alignment film.

Formula (7):

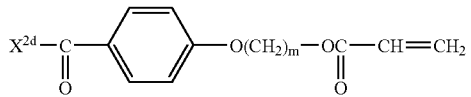

In the above formula, $X^{2d}$ represents atoms required for forming an active ester, an acid anhydride or an acid halide, and m represents an integer of 2 to 24.

Examples of polyvinyl alcohol used for reaction with a compound represented by formula (6) or (7) include the unmodified polyvinyl alcohol and the modification products of polyvinyl alcohol, such as the polyvinyl alcohol modified by copolymerization, the polyvinyl alcohol modified by chain transfer and the polyvinyl alcohol modified by block polymerization. Suitable examples of the modified polyvinyl alcohol as specified above are described in detail in JP-A-8-338913.

When a hydrophilic polymer like polyvinyl alcohol is used for the alignment film, it is appropriated that the water content be controlled in terms of hardening degree. The suitable water content is from 0.4% to 2.5%, preferably from 0.6% to 1.6%. The water content can be measured with a commercially available moisture meter according to Karl Fischer's method.

It is preferable that the alignment film has a thickness of 10 microns or below.

(Second Optically Anisotropic Layer)

A second optically anisotropic layer for use in the invention ranges in Re from 15 to 150 nm, preferably from 30 to 130 nm, far preferably from 60 to 120 nm.

And it ranges in Rth from −40 to 10 nm, preferably from −30 to 8 nm, far preferably from −25 to 5 nm.

The second optically anisotropic layer may be optically uniaxial or biaxial.

The second optically anisotropic layer is not particularly restricted as to its material also. Although it may be a liquid crystal coating or a polymer film, the second optically anisotropic layer is preferably a polymer film.

For instance, the polymer films described in WO 00/26705 can be used.

Examples of other materials for the polymer film include known materials capable of forming films by a solution casting method or an extrusion molding method, such as norbornene high polymers, polycarbonate high polymers, polyarylate high polymers, polyester high polymers and aromatic high polymers including polysulfones, and cellulose acylates like triacetyl cellulose.

The second optically anisotropic layer can be formed by subjecting a transparent film prepared from a thermoplastic resin as recited above by use of an extrusion molding or casting method for film formation to stretching treatment according to a longitudinal stretching process using a roll, or a transverse or biaxial stretching process using a tenter. The stretching temperature is preferably in the neighborhood of a glass transition temperature (Tg) of a film to be treated, particularly preferably from Tg to below the film's melting point. In the longitudinal stretching process using a roll, an appropriate heating method, such as a method of using a heating roll, a method of heating the atmosphere or a combination of these methods, can be adopted. In the biaxial stretching process using a tenter, an appropriate method, such as a simultaneous biaxial stretching method according to a full-tenter process or a sequential biaxial stretching method according to a roll-and-tenter process, can be adopted.

Of the films thus prepared, those reduced in orientation variations and retardation variations are preferred. Their thicknesses can be determined as appropriate, according to, e.g., retardation. Specifically, they are adjusted generally to a range of 1 to 300 μm, preferably to a range of 10 to 200 μm, particularly preferably to a range of 20 to 150 μm, from the profile reduction viewpoint.

Herein, the norbornene high polymers are polymers prepared mainly using norbornene monomers, such as norbornene and derivatives thereof, tetracyclododecene and derivatives thereof, dicyclopentadiene and derivatives thereof, or methanotetrahydrofluorene and derivatives thereof, with examples including ring-opening polymerization products prepared from norbornene monomers, ring-opening copolymerization products prepared from norbornene monomers and other monomers copolymerizable with the norbornene monomers through ring opening, addition polymers of norbornene monomers, addition copolymers prepared from norbornene monomers and other monomers copolymerizable with the norbornene monomers, and hydrogenation products of those polymers and copolymers. Of these high polymers, hydrogenated ring-opening polymerization products of norbornene monomers are most suitable from the viewpoints of thermal resistance and mechanical strength. The molecular weight of norbornene polymers, monocyclic olefin polymers or cyclic conjugated diene polymers can be properly chosen according to their intended uses. When the mass-average molecular weight of such a polymer, as measured by Gel Permeation Chromatography using a cyclohexane solution (or a toluene solution when the polymer resin to be examined is insoluble in cyclohexane) and calculated in terms of polyisoprene or polystyrene, is generally in a range of 5,000 to 500,000, preferably in a range of 8,000 to 200,000, far preferably in a range of 10,000 to 100,000, mechanical strength and molding processability of the film prepared can achieve a high level of balance, thereby delivering good results.

Examples of polycarbonate high polymers usable in the optically anisotropic layer include polycarbonate and mixtures of polycarbonate with other polymers.

Examples of polyarylate high polymers usable in the optically anisotropic layer include polyoxybenzoate and mixtures of polyoxybenzoate with other polymers.

Examples of polyester high polymers usable in the optically anisotropic layer include polyethylene terephthalate, polyethylene isophthalate, polyphenylene isophthalate, polybutylene terephthalate, polyethylene-2,6-naphthalate and mixtures of these polymers and other polymers.

Examples of aromatic high polymers, such as polysulfones, usable in the optically anisotropic layer include polysulfone, polyethersulfone, polyallylsulfone and mixtures of these polysulfones with other polymers.

It is particularly preferable that the second optically anisotropic layer is made from cellulose acylate.

As raw cotton for cellulose acylate, known raw materials can be used (See, e.g., Journal of technical disclosure 2001-1745, issued by the JIII). Synthesis of cellulose acylate can also be performed in accordance with known methods (See, e.g., Migita et al., *Mokuzai Kagaku*, pp. 180-190, Kyoritsu Shuppan Co., Ltd. (1968)). The viscosity-average polymerization degree of cellulose acylate is preferably from 200 to 700, far preferably from 250 to 500, particularly preferably from 250 to 350. And it is preferable that cellulose ester used in the invention is narrow in molecular-weight distribution expressed in terms of Mw/Mn, which is determined by Gel Permeation Chromatography (wherein Mw stands for mass-average molecular weight and Mn stands for number-average molecular weight). The concrete value of Mw/Mn is preferably from 1.5 to 5.0, far preferably from 2.0 to 4.5, particularly preferably from 3.0 to 4.0.

The cellulose acylate has no particular restriction as to its acyl groups, but it is advantageous to use acetyl groups or propionyl groups, particularly acetyl groups, as the acyl groups. The substitution degree of all acyl groups is preferably from 2.7 to 3.0, far preferably from 2.8 to 2.95. In the present specification, the substitution degree of acyl groups is a value calculated according to ASTM D817. The most suitable acyl groups are acetyl groups and, when cellulose acetate, namely cellulose acylate whose acyl groups are acetyl groups, is used, the acetification degree is preferably from 57.0 to 62.5%, far preferably from 58.0 to 61.5%. When the acetification degree is in such a range, it does not occur that Re becomes greater than the desired value by feed tension at the time of flow casting, and in-plane variations in values of Re and changes of the retardation values by temperature and humidity are also reduced. In addition, the substitution degree of the acyl group at the 6-position is preferably 0.9 or above from the viewpoint of controlling variations in Re and Rth.

The glass transition temperature (Tg) of a transparent resin for use in formation of the second optically anisotropic layer, though selected as appropriate according to the intended use, is preferably 70° C. or above, far preferably from 80° C. to 250° C., particularly preferably from 90° C. to 200° C. In these ranges, thermal resistance and molding processability of the film prepared can achieve a high level of balance, thereby delivering good result.

As a method for molding a transparent resin into the form of a sheet or a film, both hot-melt molding and solution flow casting methods can be used. In more detail, the hot-melt molding method can be subdivided into an extrusion molding method, a press molding method, an inflation molding method, an injection molding method, a blow molding method and a stretch molding method. Of these methods, an extrusion molding method, an inflation molding method and a press molding method are preferred over the others from the viewpoint of delivering films superior in mechanical strength and surface accuracy. And the extrusion molding method is the best of all. The molding conditions are chosen as appropriate according to the intended use and the molding method adopted. When the hot-melt molding method is adopted, for example, it is preferable that the cylinder temperature is set as appropriate within the range of 100° C. to 400° C., particularly 150° C. to 350° C. The thickness of the sheet or the film is preferably from 10 to 300 µm, far preferably from 30 to 200 µm.

Stretching of the sheet or the film is carried out at a temperature ranging from Tg−30° C. to Tg+60° C., preferably from Tg−10C to Tg+50° C., wherein the Tg stands for the glass transition temperature of the transparent resin, in at least one direction, preferably at a stretch ratio of 1.01 to 2. It is enough to carry out the stretching in at least one direction and, in the case of forming the sheet in accordance with an extrusion molding method, the preferred direction is a mechanical flow direction (extrusion direction) of the resin. As the stretching method, a free-contraction uniaxial stretching method, a width-fixation uniaxial stretching method or a biaxial stretching method is suitably adopted.

More specifically, the stretching method includes the following steps:
(1) The sheet is adjusted to the intended temperature by its being passed between rolls heated at a predetermined temperature (heating rolls),
(2) The temperature-adjusted sheet is passed firstly between rolls relatively slow in rotational speed and then between rolls faster in rotational speed. The stretch ratio can be adjusted to a range of 1 to 4 by controlling a speed ratio between the rotational speed of the first rolls and that of the second rolls. Herein, it is preferable to keep the sheet temperature constant by placing infrared heaters between the heating rolls, the first rolls and the second rolls.
(3) The thus stretched film is cooled by passage between cooling rolls.
(4) The stretched film thus cooled is rolled up with a take-up roll. For the purpose of preventing blocking between films due to the take-up, a masking film having almost the same width may be superposed upon the stretched film and taken up together, or the stretched film may be taken up while placing a tape having a narrow width and weak adhesion along at least one edge, preferably both edges, of the stretched film.

In the step (1) of the stretching method, the sheet to be passed between heating rolls may be in a state that the temperature thereof is higher than the temperature of the heating rolls, namely the state just after molding with an extruder. From the viewpoint of achieving high stretch ratio, however, it is advantageous that the temperature of the sheet is lower than that of the heating rolls, preferably room temperature. The sheet of a low temperature can be obtained in a manner that the sheet formed by molding is once cooled, and then rolled up with a take-up roll. The stretching speed is preferably from 5 to 1,000 mm/sec, far preferably from 10 to 750 mm/sec. When the stretching speed is in such ranges, not only stretching control becomes easy, but also the in-plane variations (variation range) in profile accuracy and retardation becomes small.

(Polarizing Plate)

In the invention, a polarizing plate made up of a polarizer and a pair of protective films between which the polarizer is sandwiched. For instance, the polarizing plate prepared by dyeing a polarizer including a polyvinyl alcohol film with iodine, subjecting the film to stretching, and then laminating the both sides of the film with transparent protective films can be used. The polarizing plate is disposed outside the liquid crystal cell. It is preferable that a pair of polarizing plates, each of which is made up of a polarizer and a pair of protective films between which the polarizer is sandwiched, are arranged so that the liquid crystal cell is sandwiched between them. As mentioned above, the protective film disposed on the side of the liquid crystal cell may be either of the optically anisotropic layers constituting the present optical compensation film.

<<Continual Manufacturing Process for Polarizer and Transparent Protective Film>>

The manufacturing process of the present polarizing plate has a drying step of lowering a rate of volatile components in a film for the polarizer by the film's being shrunk after stretching, and it is preferable that the process further has an after-heating step after a transparent protective film is stuck to at least one side of the polarizer after or during the drying. In an embodiment that the transparent protective film also serves as an optically anisotropic layer's substrate functioning as a transparent film, it is preferable that the after-heating step is carried out after a transparent substrate having the transparent protective film on one side and the optically anisotropic layer on the other side is made to adhere to the polarizer. As a specific way of adhesion, either of two ways as mentioned below may be adopted. In one way, the transparent protective film is stuck to the polarizer with the aid of an adhesive during the drying step of the film in a condition that both edges thereof are held, and then both the edges are cut. In the other way, the film for the polarizer is released in both edge-holding region after the drying and both edges of the film are cut, and then a transparent protective film is stuck thereto. In cutting the edges, general techniques, such as cutting with a cutter and cutting with laser, are applicable. After the adhesion, it is preferable to perform heating for the purposes of drying the adhesive and improving the polarizing properties. The heating conditions depend on the adhesive used. In the case of water-based adhesives, it is appropriate that the heating temperature be 30° C. or above, preferably from 40° C. to 100° C., far preferably from 50° C. to 90° C. From the viewpoints of performance and production efficiency, it is advantageous that those steps proceed in a seamless manufacturing line.

<<Performance of Polarizing Plate>>

Optical properties and durability (short-term and long-term storage stabilities) of a polarizing plate relating to the invention, which is made up of a transparent protective film, a polarizer and a transparent support, is preferably equivalent or superior to those of commercially available super-high contrast articles (e.g., JLC2-5618 made by Sanritz Corporation). More specifically, it is appropriate that the visible-light transmittance be 42.5% or above, the polarization degree expressed by $\{(Tp-Tc)/(Tp+Tc)\} \times \frac{1}{2}$ (wherein Tp is parallel transmittance and Tc is cross transmittance) be 0.9995 or greater, and the rates of changes caused in light transmittance and polarization degree by the polarizing plate's being allowed to stand for 500 hours under the atmosphere of 60° C.-90% RH or under dry atmosphere of 80° C. be 3% or below, preferably 1% or below, and 1% or below, preferably 0.1% or below, respectively, in terms of absolute value.

The invention will now be illustrated in more detail by reference to the following examples, but these examples should not be construed as limiting the scope of the invention.

EXAMPLE 1

(Preparation of Second Optically Anisotropic Layer)

In a mixture of 232.75 parts by mass of methylene chloride, 42.5 parts by mass of methanol and 8.50 parts by mass of n-butanol were dissolved 100 parts by mass of cellulose acetate with an acetification degree of 60.7 to 61.1%, 2.35 parts by mass of a Retardation increasing agent illustrated below, 2.75 parts by mass of triphenyl phosphate and 2.20 parts by mass of biphenyl diphenyl phosphate. The solution obtained was subjected to flow casting by means of a drum flow-casting apparatus to prepare a cellulose acetate film.

Retardation Increasing Agent

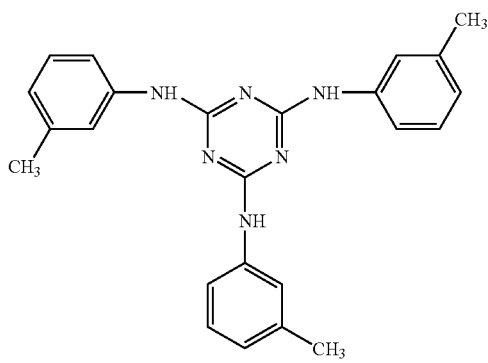

To both sides of this film, heat-shrinkable films made of uniaxially stretched polyester films were made to adhere via acrylic pressure-sensitive adhesive layers so that their slow axes were orthogonal to each other. While heating to 160° C. and shrinking the heat-shrinkable films, the layered product obtained was stretched with a stretching machine so that the dimension in the width direction became 88% of the dimension before shrinkage, and then the heat-shrinkable films were peeled away. Thus, a second optically anisotropic layer A of length 200 m was obtained. As to the characteristic values of this layer, the thickness was 90 μm, Re was 105 nm and Rth was 2 nm.

(Preparation of First Optically Anisotropic Layer)

A coating solution was prepared by dissolving 20 parts by mass of modified polyvinyl alcohol as illustrated below, 1 parts by mass of glutaraldehyde (cross-linking agent) in a mixture of 360 parts by mass of water and 120 parts by mass of methanol. The coating solution was coated on each of the second optically anisotropic layers by means of a #16 wire-bar coater, and then dried for 60 seconds with warm-air of 60° C. and further dried for 150 seconds with hot-air of 90° C. Next the coating prepared was subjected to rubbing treatment in a direction of 45° with respect to the in-plane slow axis of the second optically anisotropic layer.

Modified Polyvinyl Alcohol:

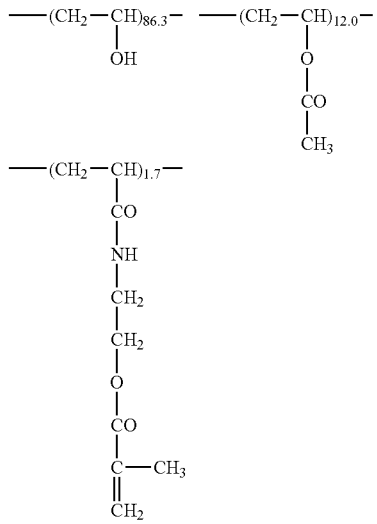

In methyl ethyl ketone was dissolved 90 parts by mass of a discotic liquid crystalline compounds as illustrated below, 10 parts by mass of ethylene oxide-modified trimethylolpropane triacrylate (V#360, produced by Osaka Organic Chemical Industry Ltd.), 0.6 parts by mass of melamineformaldehyde/acrylic acid copolymer (Aldrich reagent), 3.0 parts by mass of a photopolymerization initiator (Irgacure 907, produced by Nihon Ciba-Geigy K. K.) and 1.0 parts by mass of a photo-sensitizer (Kayacure DETX, produced by Nippon Kayaku Co., Ltd.), thereby preparing a coating solution 38% in solids concentration.

Discotic Liquid Crystalline Compound (1):

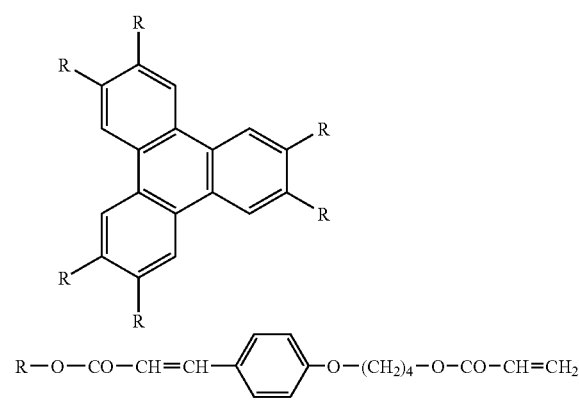

The coating solution was coated on an alignment film by means of a #3.4 wire bar. The alignment film with this coating was heated for 3 minutes in a 120° C. thermostat, thereby aligning the discotic liquid crystalline compound, and then irradiated with ultraviolet rays to polymerize the discotic liquid crystalline compound; as a result, the aligned state was fixed. The thus prepared first optically anisotropic layer was 1.6 μm thick and the Re(550) thereof was 33 nm. In this way, the first optically anisotropic layer of length 150 m was prepared.

(Preparation of Polarizing Plate)

A saponified protective film (Fuji Tack, cellulose acetate, produced by Fuji Photo Film Co., Ltd.) was stuck to one side of the polarizer with an adhesive, and the second optically anisotropic layer and the first optically anisotropic layer were stuck in order of mention to the other side of the polarizer with an adhesive. In this way, a polarizing plate A of length 120 m was prepared.

(Preparation of Liquid Crystal Cell of ECB Mode)

A liquid crystal cell was formed by making a cell-gap setting of 3.5 μm, and dripping a liquid crystal material positive in dielectric constant anisotropy into a space between substrates and sealing in the liquid crystal material. Herein, the Δnd of the liquid crystal layer was adjusted to 300 nm, and the liquid crystal material used (MLC-9100, produced by Merck KGaA) had a positive dielectric constant anisotropy Δε of the order of +8.5 and a refractive index anisotropy of 0.854 (at 589 nm, 20° C.).

The polarizing plate A was stuck to either side of the liquid crystal cell formed as shown in FIG. 1, and integrated into a liquid crystal display. Under conditions that a voltage of 1.2 V rms was applied at the time of white display and a volatge of 3,5 V rms was applied at the time of black display, contrast ratios as ratios between transmittances (at the times of white display and black display) were measured with EZ-Contrast 160D (made by ELDIM SA), and thereby angle (polar angles) evaluations at contrast ratios of 10 or above were performed. Results obtained are shown in Table (Preparation of Second Optically Anisotropic Layer)

Polycarbonate of bisphenol A type (C1400, produced by Teijin Chemicals Ltd.) was dissolved in methylene chloride to prepare a dope solution 18 mass % in solids concentration. A filmy flow was formed from this dope solution on a substrate in accordance with a solution flow casting method. This filmy matter was released from the substrate, and dried by gradually raising its temperature up to Tg−20° C. to make a film. To both sides of this film, heat-shrinkable films made of uniaxially stretched polyester films were made to adhere via acrylic pressure-sensitive adhesive layers so that their slow axes were orthogonal to each other. While heating to 160° C. and shrinking the heat-shrinkable films, the layered product obtained was stretched with a stretching machine so that the dimension in the width direction became 94% of the dimension before shrinkage, and then the heat-shrinkable films were peeled away. Thus, a second optically anisotropic layer B of length 200 m was obtained. As to the characteristic values of this layer, the thickness was 80 μm, Re was 80 nm and Rth was −8 nm.

In the same manner as in Example 1, a polarizing plate B of the length 80 m was prepared through adhesion of the first optically anisotropic layer of the length 120 m formed in the same way as in Example 1 to the second optically anisotropic layer B.

In the same manner as in Example 1, the polarizing plates B were stuck to the ECB liquid crystal cell as shown in FIG. 1, and angles (polar angles) providing contrast ratios of 10 or above were evaluated. Results obtained are also shown in Table 1.

COMPARATIVE EXAMPLE 1

Still another liquid display device was produced in the same manner as in Example 1, except that a commercially available saponified cellulose acetate film (FujiTack TD80UF, produced by Fuji Photo Film Co., Ltd.) was used as second optically anisotropic layer and the direction for rubbing the first optically anisotropic layer was made orthogonal to the slow axis of the second optically anisotropic layer, and optical characteristics of the device thus produced were evaluated using the same method as in Example 1. Results obtained are also shown in Table 1.

TABLE 1

| | Re | Rth | Upper | Right upper | Right | Right lower | Lower | Left lower | Left | Left upper |
|---|---|---|---|---|---|---|---|---|---|---|
| Example 1 | 105 | 2 | up to 85 | up to 85 | up to 85 | up to 85 | up to 85 | up to 80 | up to 85 | up to 85 |
| Example 2 | 80 | −8 | up to 85 | up to 80 | up to 85 | up to 80 | up to 85 | up to 75 | up to 85 | up to 80 |
| Comparative Example 1 | 2 | 40 | up to 85 | up to 50 | up to 85 | up to 40 | up to 85 | up to 30 | up to 85 | up to 40 |

The retardation values enumerated herein are those of the second optically anisotropic layers and their unit is nm.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-88467 filed Mar. 25 of 2005, the contents of which is incorporated herein by reference.

What is claimed is:

1. An optical compensation film comprising:
   a first optically anisotropic layer formed from a discotic liquid crystalline compound; and
   a second optically anisotropic layer having an Re(550) of 15 to 150 nm and an Rth(550) of −40 to 10 nm, wherein Re(λ) is an in-plane retardation by nm at a wavelength of λ nm, and Rth(λ) is a thickness-direction retardation by nm at a wavelength of λ nm,
   wherein the optical compensation film is for a liquid crystal display of ECB mode.

2. The optical compensation film according to claim 1, wherein the second optically anisotropic layer comprises cellulose acylate.

3. The optical compensation film according to claim 1, which is a film cut from a long length of roll film along a direction parallel or perpendicular to the longitudinal direction of the roll film.

4. A polarizing plate comprising: a polarizer; and an optical compensation film according to claim 1.

5. The optical compensation film according to claim 1, which is for a liquid crystal display of ECB mode, wherein
the liquid crystal display comprises a polarizer and a liquid crystal cell driven in ECB mode, and
the optical compensation film is used in the liquid crystal display in conditions that:
a transmission axis of the polarizer and a slow axis of the second optically anisotropic layer are parallel,
the slow axis of the second optically anisotropic layer forms an angle of 45 degrees with respect to a slow axis of the first optically anisotropic layer, and
the slow axis of the first optically anisotropic layer and a slow axis of the liquid crystal cell are orthogonal to each other.

6. A liquid crystal display comprising:
a polarizer;
a liquid crystal cell driven in ECB mode; and
an optical compensation film comprising: a first optically anisotropic layer formed from a discotic liquid crystalline compound; and a second optically anisotropic layer having an Re(550) of 15 to 150 nm and an Rth(550) of −40 to 10 nm, wherein Re($\lambda$) is an in-plane retardation by nm at a wavelength of $\lambda$ nm, and Rth($\lambda$) is a thickness-direction retardation by nm at a wavelength of $\lambda$ nm,
wherein
a transmission axis of the polarizer and a slow axis of the second optically anisotropic layer are parallel,
the slow axis of the second optically anisotropic layer forms an angle of 45 degrees with respect to a slow axis of the first optically anisotropic layer, and
the slow axis of the first optically anisotropic layer and a slow axis of the liquid crystal cell are orthogonal to each other.

* * * * *